US012564999B2

(12) United States Patent
Kinjoh et al.

(10) Patent No.: US 12,564,999 B2
(45) Date of Patent: Mar. 3, 2026

(54) DIGITAL EMBOSSING CREATION METHOD

(71) Applicant: SAKATA INX CORPORATION, Osaka (JP)

(72) Inventors: Jun Kinjoh, Osaka (JP); Koki Ogasahara, Osaka (JP); Okinori Nakashima, Osaka (JP); Takuya Myose, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 137 days.

(21) Appl. No.: 18/689,026

(22) PCT Filed: Jun. 27, 2022

(86) PCT No.: PCT/JP2022/025522
§ 371 (c)(1),
(2) Date: Mar. 4, 2024

(87) PCT Pub. No.: WO2023/037712
PCT Pub. Date: Mar. 16, 2023

(65) Prior Publication Data
US 2024/0399649 A1 Dec. 5, 2024

(30) Foreign Application Priority Data
Sep. 8, 2021 (JP) ................................. 2021-146236

(51) Int. Cl.
*B29C 64/112* (2017.01)
*B33Y 10/00* (2015.01)
*B33Y 70/00* (2020.01)
*B29K 33/00* (2006.01)
*B29K 105/00* (2006.01)

(52) U.S. Cl.
CPC ............ *B29C 64/112* (2017.08); *B33Y 10/00* (2014.12); *B33Y 70/00* (2014.12); *B29K 2033/08* (2013.01); *B29K 2105/0094* (2013.01)

(58) Field of Classification Search
None
See application file for complete search history.

(56) References Cited

U.S. PATENT DOCUMENTS

2019/0310550 A1    10/2019   Belelie et al.

FOREIGN PATENT DOCUMENTS

| JP | H06278354 A | 10/1994 |
|---|---|---|
| JP | 2009173003 A | 8/2009 |
| JP | 2010253758 A | 11/2010 |
| JP | 2014 213 247 A | * 11/2014 |
| JP | 2019181937 A | 10/2019 |
| JP | 2020049827 A | 4/2020 |

OTHER PUBLICATIONS

International Search Report (ISR) mailed Jul. 26, 2022, issued for International application No. PCT/JPJP2022/025522. (2 pages).
International Preliminary Report on Patentability, dated Mar. 5, 2024, for corresponding international application PCT/JP2022/025522 (1 page).
Notification Concerning Transmittal of International Preliminary Report on Patentability, mailed Mar. 21, 2024, for corresponding international application PCT/JP2022/025522 (1 page).
Notification of Transmittal of Translation of the International Preliminary Report on Patentability, mailed Mar. 21, 2024, for corresponding international application PCT/JP2022/025522 (1 page).
Written Opinion of the International Searching Authority, mailed Jul. 26, 2022, for corresponding international application PCT/JP2022/025522 (3 pages).

* cited by examiner

*Primary Examiner* — Mohammad M Ameen
(74) *Attorney, Agent, or Firm* — Law Office of Katsuhiro Arai

(57) ABSTRACT
A digital embossing creation method includes landing a first active energy ray curable inkjet ink composition on a substrate surface by inkjet printing in the form of liquid droplets of 10.0 pl or greater in volume per droplet, and then irradiating it with an active energy ray for pinning, to form a first layer; and next, landing a second active energy ray curable inkjet ink composition on the first layer by inkjet printing in the form of liquid droplets of 10.0 pl or greater in volume per droplet, and then irradiating it with an active energy ray for pinning, to form a second layer wherein the first and second compositions have a viscosity of 14.0 cps or higher at 25° C., and a value of [(surface tension of the second composition before curing)−(surface tension of the first composition before curing)] is 4.0 mN/m or greater.

9 Claims, No Drawings

DIGITAL EMBOSSING CREATION METHOD

CROSS-REFERENCE TO RELATED APPLICATIONS

This application is the U.S. National Phase under 35 U.S.C. § 371 of International Application PCT/JP2022/025522, filed Jun. 27, 2022, which claims priority to Japanese Patent Application No. JP2021-146236, filed Sep. 8, 2021. The International Application was published under PCT Article 21 (2) in a language other than English.

TECHNICAL FIELD

The present invention relates to a digital embossing creation method.

BACKGROUND ART

It is known that printed matters, when foils, partial varnish coats, and textures are added to graphical designs by means of decorative three-dimensional printing, appeal to our visual and tactile senses in that the resulting images become glossier and brighter, create a feeling of depth particularly through tactile sensations, appear dynamic and attractive, and make people want to touch them.

For example, Patent Literature 1 describes how realistic wood grain patterns can be expressed easily using, not a curable ink composition, but a clear ink. In this case, however, there are limits to forming thick clear varnish films.

Also, Patent Literature 2 describes a method of digital embossing that uses a curable gel composition to form raised images. It is indicated that the obtained raised images are 40 to 60 μm in height and, according to the examples and FIGS. 1 and 2 showing the results thereof, convex parts of approx. 2 mm in height can also be formed using a composition having a specific component makeup.

BACKGROUND ART LITERATURE

Patent Literature

Patent Literature 1: Japanese Patent Laid-open No. 2009-173003
Patent Literature 2: Japanese Patent Laid-open No. 2019-181937

SUMMARY OF THE INVENTION

Problems to be Solved by the Invention

An object of the present invention is to provide a method for forming desired convex shapes in desired areas while also allowing for formation of finer, sharper convex parts so that embossed patterns with clearly defined concave/convex parts can be formed, on demand, without requiring an etching process or brushing process, and by using any of various types of known inkjet printing devices, in order to form an embossed surface.

Means for Solving the Problems

As a result of studying in earnest to achieve the aforementioned object, the inventors of the present invention completed the present invention below.

Specifically, the present invention is as follows.

1. A digital embossing creation method using active energy ray curable inkjet ink compositions, wherein the digital embossing formation method comprises: having a first active energy ray curable inkjet ink composition landed on a substrate surface in the form of liquid droplets of 10.0 pl or greater in volume per droplet, and then irradiated with an active energy ray for pinning, to form a first layer; and next, having a second active energy ray curable inkjet ink composition landed on the first layer in the form of liquid droplets of 10.0 pl or greater in volume per droplet, and then irradiated with an active energy ray for pinning, to form a second layer; and wherein the digital embossing creation method further satisfies condition 1 and condition 2 below:

condition 1: the first and second active energy ray curable inkjet ink compositions have a viscosity of 14.0 cps (25° C.) or higher; and condition 2: (surface tension of the second active energy ray curable inkjet ink composition before curing)−(surface tension of the first active energy ray curable inkjet ink composition before curing) is 4.0 mN/m or greater.

2. The digital embossing creation method according to 1, being condition 3: (surface tension of the first active energy ray curable inkjet ink composition before curing)−(surface tension of the substrate surface) is −15.0 mN/m or greater.

3. The digital embossing creation method according to 1 or 2, wherein a/the surface tension of the substrate surface is 22.0 to 40.0 mN/m, the surface tension of the first active energy ray curable inkjet ink composition before curing is 22.0 to 29.0 mN/m, and the surface tension of the second active energy ray curable inkjet ink composition before curing is 26.0 to 34.0 mN/m.

4. The digital embossing creation method according to any one of 1 to 3, wherein, after the first active energy ray curable inkjet ink composition and second active energy ray curable inkjet ink composition were each landed, the time to pin each coating film by irradiating with an active energy ray is within 0.5 seconds.

5. The digital embossing creation method according to any one of 1 to 4, wherein the first active energy ray curable inkjet ink composition and the second active energy ray curable inkjet ink composition each independently contain monofunctional photopolymerizable compounds, multi-functional photopolymerizable compounds, and surfactants.

6. The digital embossing creation method according to any one of 1 to 5, wherein the total sum of the film thickness of the cured layer of the first active energy ray curable inkjet ink composition, and a film thickness of the cured layer of the second active energy ray curable inkjet ink composition, is 80.0 μm or greater.

7. The digital embossing creation method according to any one of 1 to 6, wherein the first and second active energy ray curable inkjet ink compositions contain at least one type selected from alicyclic alkyl group-containing (meth)acrylates, acryloyl morpholine, and amine-modified acrylate monomers.

Effects of the Invention

According to the present invention, fine digital embossing with sufficiently large dot heights can be obtained from overlaid ink compositions, without performing an etching process or brushing process, in order to form an embossed surface. It should be noted that digital embossing is a method for forming convex parts on a target substrate using an inkjet-type application device.

MODE FOR CARRYING OUT THE INVENTION

The present invention is a digital embossing creation method using active energy ray curable inkjet ink compositions, where the requirements below must be satisfied.

A digital embossing creation method using active energy ray curable inkjet ink compositions, wherein the digital embossing formation method comprises:

having a first active energy ray curable inkjet ink composition landed on a substrate surface in the form of liquid droplets of 10.0 pl or greater in volume per droplet, and then irradiated with an active energy ray for pinning, to form a first layer; and next, having a second active energy ray curable inkjet ink composition landed on the first layer in the form of liquid droplets of 10.0 pl or greater in volume per droplet, and then irradiated with an active energy ray for pinning, to form a second layer; and wherein the digital embossing creation method further satisfies condition 1 and condition 2 below:

condition 1: the first and second active energy ray curable inkjet ink compositions have a viscosity of 14.0 cps (25° C.) or higher; and condition 2: (surface tension of the second active energy ray curable inkjet ink composition before curing)–(surface tension of the first active energy ray curable inkjet ink composition before curing) is 4.0 mN/m or greater.

<Viscosity>

The viscosities under the present invention represent values of viscosity (unit: cps) measured using a type-B viscometer under the conditions of 25° C. and 60 rpm.

<Surface Tension>

Surface tension was measured using the automatic surface tension gauge DY-300 by Kyowa Interface Science Co., Ltd.

Surface tensions under the present invention represent values at 25° C.

<Active Energy Ray>

The active energy ray under the present invention may be any ray of light as long as it is capable of curing the active energy ray curable components listed below, and may be an ultraviolet ray, electron beam, $\alpha$-ray, $\beta$-ray, $\gamma$-ray, etc.

<Active Energy Ray Curable Components>

The active energy ray curable components (all polymerizable components) contained in the first and second active energy ray curable inkjet ink compositions in the present invention include one or more types of the compounds listed below.

And, among the compounds listed below, preferably one or more types selected from alicyclic alkyl group-containing (meth)acrylates, acryloyl morpholine, and amine-modified acrylate monomers are contained. Additionally, formation of embossing offering better adhesion and greater concavity/convexity is facilitated when these compounds are contained. Also, oligomers may or may not be contained.

Additionally, among the aforementioned alicyclic alkyl group-containing (meth)acrylates, preferably isobornyl (meth)acrylates and/or tert-butylcyclohexyl (meth)acrylates are contained. In this case, the total content of isobornyl (meth)acrylates and tert-butylcyclohexyl (meth)acrylates in all polymerizable components is preferably 25.0% by mass or higher, or more preferably 30.0% by mass or higher. Also, it is preferably 90.0% by mass or lower, or more preferably 85.0% by mass or lower.

The total content of alicyclic alkyl group-containing (meth)acrylates in all polymerizable components is preferably 15.0% by mass or higher, or more preferably 30.0% by mass or higher, or yet more preferably 60.0% by mass or higher, or most preferably 80.0% by mass or higher. Also, it is preferably 93.0% by mass or lower, or more preferably 90.0% by mass or lower.

Furthermore, when amine-modified acrylate monomers are contained, the content of amine-modified acrylate monomers in all polymerizable components is preferably 8.0% by mass or higher, and preferably 30.0% by mass or lower, or yet more preferably 25.0% by mass or lower.

Also, preferably the active energy ray curable components contained in the first and second active energy ray curable inkjet ink compositions under the present invention are monomers and oligomers of the same compounds because this allows for formation of finer convex parts when creating digital embossing by curing the first and second active energy ray curable inkjet ink compositions. When this is the case, the first and second active energy ray curable inkjet ink compositions differ in terms of the compounds constituting, and contents of, the components other than the polymerizable components.

—Unsaturated Carboxylic Acid-Based Compounds—

The unsaturated carboxylic acid-based compounds include, for example, (meth)acrylic acid, itaconic acid, crotonic acid, isocrotonic acid, fumaric acid, maleic acid, and other unsaturated carboxylic acids, as well as salts thereof and acid anhydrides thereof, etc.

—Alkyl (Meth)Acrylate-Based Compounds—

The alkyl (meth)acrylate-based compounds include, for example, methyl (meth)acrylate, ethyl (meth)acrylate, propyl (meth)acrylate, isopropyl (meth)acrylate, n-butyl (meth) acrylate, i-butyl (meth)acrylate, t-butyl (meth)acrylate, amyl (meth)acrylate, isoamyl (meth)acrylate, hexyl (meth)acrylate, 2-ethylhexyl (meth)acrylate, octyl (meth)acrylate, decyl (meth)acrylate, dodecyl (meth)acrylate, isooctyl (meth)acrylate, lauryl (meth)acrylate, stearyl (meth)acrylate, isostearyl (meth)acrylate, isodecyl (meth)acrylate, isomyristyl (meth)acrylate, octadecyl (meth)acrylate, dicyclopentanyl (meth)acrylate, tridecyl (meth)acrylate, nonyl (meth)acrylate, hexadecyl (meth)acrylate, myristyl (meth) acrylate, as well as alicyclic alkyl group-containing (meth) acrylates including isobornyl (meth)acrylate, cyclohexyl (meth)acrylate, norbornyl (meth)acylate, dicyclopentenyl (meth)acrylate, dicyclopentenyloxyethyl (meth)acrylate, 1-adamantyl (meth)acrylate, 3,5,5-trimethylcyclohexyl (meth)acrylate, 4-t-butylcyclohexyl (meth)acrylate, benzyl (meth)acrylate, etc.

—Hydroxyl Group-Containing (Meth)Acrylate-Based Compounds—

The hydroxyl group-containing (meth)acrylate-based compounds include, for example, 2-hydroxyethyl (meth) acrylate, 2-hydroxypropyl (meth)acrylate, 3-hydroxypropyl (meth)acrylate, 2-hydroxybutyl (meth)acrylate, 4-hydroxybutyl (meth)acrylate, hydroxypentyl (meth)acrylate, 2-hydroxy-3-methoxypropyl (meth)acrylate, 2-hydroxy-3-butoxypropyl (meth)acrylate, diethylene glycol mono(meth) acrylate, triethylene glycol mono(meth)acrylate, polyethylene glycol mono(meth)acrylate, dipropylene glycol mono(meth)acrylate, polypropylene glycol mono(meth) acrylate, 1,6-hexanediol mono(meth)acrylate, glycerin mono(meth)acrylate, 2-hydroxy-3-chloropropyl (meth)acrylate, 2-hydroxy-3-phenoxypropyl (meth)acrylate, 2-hydroxy-3-allyloxypropyl (meth)acrylate, (meth)acrylic acid-2-hydroxy-3-allyloxypropyl, 2-(meth)acryloyloxyethyl-2-hydroxypropyl phthalate, 2-ethylhexyl EO-modified (meth)

acrylate, o-phenylphenol EO-modified (meth)acrylate, p-cumylphenol EO-modified (meth)acrylate, nonylphenol EO-modified (meth)acrylate, and other (poly)alkylene glycol-modified (meth)acrylates, etc.

—Halogen-Containing (Meth)Acrylate-Based Compounds—

The halogen-containing (meth)acrylate-based compounds include, for example, trifluoromethyl (meth)acrylate, 2,2,2-trifluoroethyl (meth)acrylate, 2,2,3,3-tetrafluoropropyl (meth)acrylate, 1H-hexafluoroisopropyl (meth)acrylate, 1H,1H,5H-octafluoropentyl (meth)acrylate, 1H,1H,2H,2H-heptadecafluorodecyl (meth)acrylate, 2,6-dibromo-4-butylphenyl (meth)acrylate, 2,4,6-tribromophenoxyethyl (meth)acrylate, 2,4,6-tribromophenol 3EO (ethylene oxide) adduct (meth)acrylate, etc.

—Ether Group-Containing (Meth)Acrylate-Based Compounds—

The ether group-containing (meth)acrylate-based compounds include, for example, 1,3-butylene glycol methyl ether (meth)acrylate, methoxy triethylene glycol (meth)acrylate, methoxy dipropylene glycol (meth)acrylate, methoxy tripropylene glycol (meth)acrylate, methoxy polypropylene glycol (meth)acrylate, ethoxy diethylene glycol (meth)acrylate, ethyl carbitol (meth)acrylate, 2-ethylhexyl carbitol (meth)acrylate, tetrahydrofurfuryl (meth)acrylate, cresyl polyethylene glycol (meth)acrylate, (meth)acrylic acid-2-(vinyloxyethoxy) ethyl, phenoxyethyl (meth)acrylate, p-nonylphenoxyethyl (meth)acrylate, p-nonylphenoxypolyethylene glycol (meth)acrylate, glycidyl (meth)acrylate, phenoxydiethylene glycol (meth)acrylate, phenoxy-polyethylene glycol (meth)acrylate, hexaethylene glycol monophenyl ether mono(meth)acrylate, diethylene glycol monobutyl ether (meth)acrylate, dipropylene glycol monomethyl ether (meth)acrylate, 3-methoxybutyl (meth)acrylate, methoxydiethylene glycol (meth)acrylate, methoxypropylene glycol (meth)acrylate, methoxypolyethylene glycol (meth)acrylate (number of EO repeating units: 400, 700, etc.), 2-(2-ethoxyethoxy) ethyl (meth)acrylate, 2-ethoxyethyl (meth)acrylate, 2-methoxyethyl (meth)acrylate, ethoxyethyl (meth)acrylate, ethoxyethoxyethyl (meth)acrylate, butoxyethyl (meth)acrylate, alkoxylated 2-phenoxyethyl (meth)acrylate, (ethoxylated 2-phenoxyethyl (meth)acrylate, propoxylated 2-phenoxyethyl (meth)acrylate, etc.), alkoxylated nonylphenyl (meth)acrylate (ethoxylated (4) nonylphenol acrylate, etc.), 2-phenoxyethyl (meth)acrylate, paracumylphenoxyethylene glycol (meth)acrylate, methylphenoxyethyl (meth)acrylate, ethoxylated succinic acid (meth)acrylate, ethoxylated tribromophenyl (meth)acrylate, ethoxylated nonylphenyl (meth)acrylate, and other alkoxy- and/or phenoxy-based (meth)acrylates, etc.

—Carboxyl Group-Containing (Meth)Acrylate-Based Compounds—

The carboxyl group-containing (meth)acrylate-based compounds include, for example, ß-carboxyethyl (meth)acrylate, succinic acid (meth)monoacryloyloxyethyl ester, ω-carboxypolycaprolactone mono(meth)acrylate, 2-(meth)acryloyloxyethyl hydrogen phthalate, 2-(meth)acryloyloxypropyl hydrogen phthalate, 2-(meth)acryloyloxypropyl hexahydrohydrogen phthalate, 2-(meth)acryloyloxypropyl tetrahydrohydrogen phthalate, etc.

—Vinyl Ether Group-Containing (Meth)Acrylate-Based Compounds—

The vinyl ether group-containing (meth)acrylate-based compounds include, for example, (meth)acrylic acid-2-vinyloxyethyl, (meth)acrylic acid-3-vinyloxypropyl, (meth)acrylic acid-1-methyl-2-vinyloxyethyl, (meth)acrylic acid-2-vinyloxypropyl, (meth)acrylic acid-4-vinyloxybutyl, (meth)acrylic acid-1-methyl-3-vinyloxypropyl, (meth)acrylic acid-1-vinyloxymethylpropyl, (meth)acrylic acid-2-methyl-3-vinyloxypropyl, (meth)acrylic acid-3-methyl-3-vinyloxypropyl, (meth)acrylic acid-1,1-dimethyl-2-vinyloxyethyl, (meth)acrylic acid-3-vinyloxybutyl, (meth)acrylic acid-1-methyl-2-vinyloxypropyl, (meth)acrylic acid-2-vinyloxybutyl, (meth)acrylic acid-4-vinyloxycyclohexyl, (meth)acrylic acid-5-vinyloxypentyl, (meth)acrylic acid-6-vinyloxyhexyl, (meth)acrylic acid-4-vinyloxymethylcyclohexylmethyl, (meth)acrylic acid-3-vinyloxymethylcyclohexylmethyl, (meth)acrylic acid-2-vinyloxymethylcyclohexylmethyl, (meth)acrylic acid-p-vinyloxymethylphenylmethyl, (meth)acrylic acid-m-vinyloxymethylphenylmethyl, (meth)acrylic acid-o-vinyloxymethylphenylmethyl, (meth)acrylic acid-2-(vinyloxyisopropoxy)ethyl, (meth)acrylic acid-2-(vinyloxyethoxy)propyl, (meth)acrylic acid-2-(vinyloxyethoxy)isopropyl, (meth)acrylic acid-2-(vinyloxyisopropoxy)propyl, (meth)acrylic acid-2-(vinyloxyisopropoxy)isopropyl, (meth)acrylic acid-2-(vinyloxyethoxyethoxy)ethyl, (meth)acrylic acid-2-(vinyloxyethoxyisopropoxy)ethyl, (meth)acrylic acid-2-(vinyloxyisopropoxyethoxy)ethyl, (meth)acrylic acid-2-(vinyloxyisopropoxyisopropoxy)ethyl, etc.

—Other (Meth)Acrylate-Based Compounds—

The other (meth)acrylate-based compounds include, for example, acryloyl morpholine, amine-modified acrylate monomers including N,N-dimethylaminoethyl (meth)acrylate, N,N-dimethylaminopropyl (meth)acrylate, etc., as well as morpholinoethyl (meth)acrylate, trimethylsiloxyethyl (meth)acrylate, diphenyl-2-(meth)acryloyloxyethyl phosphate, 2-(meth)acryloyloxyethyl acid phosphate, caprolactone-modified-2-(meth)acryloyloxyethyl acid phosphate, 2-hydroxy-1-(meth)acryloxy-3-methacryloxypropane, acryloxyethyl phthalate, 2-(meth)acryloyloxyethyl-2-hydroxyethyl phthalate, 2-(meth)acryloyloxypropyl phthalate, tricyclodecanemonomethylol (meth)acrylate, (meth)acrylic acid dimer, diethylaminoethyl (meth)acrylate, 2-(meth)acryloyloxyethyl succinic acid, 2-(meth)acryloyloxyethyl hexahydrophthalic acid, 2-ethylhexyl-diglycol (meth)acrylate, aminoethyl (meth)acrylate, ethyl carbitol (meth)acrylate, ethyl diglycol (meth)acrylate, quaternary salt of dimethylaminoethyl (meth)acrylate benzyl chloride, tribromophenyl (meth)acrylate, 1,4-cyclohexanedimethanol mono(meth)acrylate, cresol (meth)acrylate, trimethylolpropane formal (meth)acrylate, neopentyl glycol (meth)acrylic acid-benzoic acid ester, (2-methyl-2-ethyl-1,3-dioxolane-4-yl) methyl (meth)acrylate, 1-(meth)acryloylpiperidine-2-one, 2-(meth)acrylic acid-1,4-dioxaspiro [4,5]deci-2-ylmethyl, N-(meth)acryloyloxyethyl hexahydrophthalimide, γ-butylolactone (meth)acrylate, caprolactone-modified tetrahydrofurfuryl (meth)acrylate, imide acrylate, (meth)acrylic acid vinyl, maleimide, etc.

—Styrene-Based Compounds—

The styrene-based compounds include, for example, styrene, vinyl toluene, p-hydroxystyrene, p-chlorostyrene, p-bromostyrene, p-methylstyrene, p-methoxystyrene, p-t-butoxystyrene, p-t-butoxycarbonylstyrene, p-t-butoxycarbonyloxystyrene, 2,4-diphenyl-4-methyl-1-pentene, divinyl benzene, etc.

—N-Vinyl-Based Compounds—

The N-vinyl-based compounds include, for example, N-vinylpyrrolidone, N-vinylformamide, N-vinylacetamide, N-vinyl-2-caprolactam, N-vinylcarbazole, etc.

—Allylate-Based Compounds—

The allylate-based compounds include, for example, allyl glycidyl ether, diallyl phthalate, triallyl trimellitate, isocyanuric acid triallylate, etc.

—Other Compounds Having One Ethylenic Unsaturated Bond—

Among the compounds having one ethylenic unsaturated bond, "other compounds having one ethylenic unsaturated bond" other than the aforementioned compounds may be used.

Such compounds include, for example, vinyl acetate, vinyl monochloroacetate, vinyl benzoate, vinyl pivalate, vinyl butylate, vinyl laurate, divinyl adipate, vinyl crotonate, vinyl 2-ethylhexanoate, three-membered ring compounds (for example, vinylcyclopropanes, 1-phenyl-2-vinylcyclopropanes, 2-phenyl-3-vinyloxyranes, 2,3-divinyloxyranes, etc.), cyclic ketene acetals (for example, 2-methylene-1,3-dioxepane, dioxolanes, 2-methylene-4-phenyl-1,3-dioxepane, 4,7-dimethyl-2-methylene-1,3-dioxepane, 5,6-benzo-2-methylene-1,3-dioxepane, etc.), etc.

(Compounds Having Two Ethylenic Unsaturated Bonds)

The active energy ray curable inkjet ink compositions under the present invention may use known compounds having two ethylenic unsaturated bonds.

Among such compounds having two ethylenic unsaturated bonds, any known compounds may be used without limitation, including, for example, ethylene glycol di(meth) acrylate, diethylene glycol di(meth)acrylate, triethylene glycol di(meth)acrylate, tetraethylene glycol di(meth)acrylate, 1,6-hexanediol diacrylate, polyethylene glycol di(meth) acrylate, polyethylene glycol (100) di(meth)acrylate, polyethylene glycol (400) di(meth)acrylate, polyethylene glycol (700) di(meth)acrylate, propylene glycol di(meth)acrylate, dipropylene glycol di(meth)acrylate, tripropylene glycol di(meth)acrylate, tetrapropylene glycol di(meth)acrylate, polypropylene glycol di(meth)acrylate, cyclohexanedimethanol di(meth)acrylate, dicyclopentanyl di(meth)acrylate, dimethyloloctane di(meth)acrylate, dimethylol-tricyclodecane di(meth)acrylate, dimethylolpropane di(meth)acrylate, tetraethylene glycol di(meth)acrylate, triethylene glycol di(meth)acrylate, tricyclodecanedimethylol di(meth)acrylate, tris(2-hydroxyethyl)isocyanurate di(meth)acrylate, hydroxypivalic acid neopentyl glycol di(meth)acrylate, polytetramethylene glycol di(meth)acrylate, 1,3-butylene glycol di(meth)acrylate, 1,4-dimethyl-2,4-pentanediol di(meth)acrylate, 1,4-butanediol di(meth)acrylate, 1,5-dimethyl-2,5-hexanediol di(meth)acrylate, 1,5-pentanediol di(meth)acrylate, pentyl glycol di(meth)acrylate, neopentyl glycol di(meth)acrylate, hydroxypivalyl hydroxypivalate di(meth)acrylate, hydroxypivalyl hydroxypivalate dicaprolactonate di(meth)acrylate, 1,6-hexanediol di(meth)acrylate, 1,2-hexanediol di(meth)acrylate, 1,5-hexanediol di(meth) acrylate, 2,5-hexanediol di(meth)acrylate, 1,7-heptanediol di(meth)acrylate, 1,8-octanediol di(meth)acrylate, 1,2-octanediol di(meth)acrylate, 1,9-nonanediol di(meth)acrylate, 1,10-decanediol di(meth)acrylate, 1,2-decanediol di(meth) acrylate, 1,12-dodecanediol di(meth)acrylate, 1,2-dodecanediol di(meth)acrylate, 1,14-tetradecanediol di(meth)acrylate, 1,2-tetradecanediol di(meth)acrylate, 1,16-hexadecanediol di(meth)acrylate, 1,2-hexadecanediol di(meth)acrylate, 2-methyl-2,4-pentanediol di(meth)acrylate, 3-methyl-1,5-pentanediol di(meth)acrylate, 2-methyl-2-propyl-1,3-propanediol di(meth)acrylate, 2,4-dimethyl-2,4-pentanediol di(meth)acrylate, 2,2-diethyl-1,3-propanediol di(meth)acrylate, 2,2,4-trimethyl-1,3-pentanediol di(meth) acrylate, dimethyloloctane di(meth)acrylate, 2-ethyl-1,3-hexanediol di(meth)acrylate, 2,5-dimethyl-2,5-hexanediol di(meth)acrylate, 2-methyl-1,8-octanediol di(meth)acrylate, 2,4-diethyl-1,5-pentanediol di(meth)acrylate, 2-methyl-1,3-butylene glycol di(meth)acrylate, 2-n-butyl-2-ethyl-1,3-propanediol di(meth)acrylate, tricyclodecane dimethylol dicaprolactonate di(meth)acrylate, dimethylol dicyclopentane di(meth)acrylate, 1,6-hexanediol bis(2-hydroxy-3-(meth)acryloyloxypropyl) ether, bis(4-(meth)acryloxypolyethoxyphenyl)propane, pentaerythritol di(meth)acrylate, pentaerythritol di(meth)acrylate monostearate, pentaerythritol di(meth)acrylate monobenzoate, glycerin di(meth)acrylate, 2-hydroxy-1,3-di(meth)acryloxypropane, diethylene glycol divinyl ether, cyclohexanedimethanol divinyl ether, dipropylene glycol divinyl ether, triethylene glycol divinyl ether, trimethylolpropane divinyl ether, butanediol divinyl ether, propylene glycol divinyl ether, hexanediol divinyl ether, trimethylolpropane diallyl ether, (meth)acrylic acid vinyloxyalkyl, vinyloxyethoxyethyl (meth)acrylate, N,N'-methylenebisacrylamide, bisphenol A di(meth)acrylate, bisphenol F di(meth)acrylate, hydroxypivalyl hydroxypivalate di(meth)acrylate, hydrogenated bisphenol A di(meth)acrylate, hydrogenated bisphenol F di(meth)acrylate, etc.

Also included are, for example, alkoxylated products (for example, ethoxylated, propoxylated or butoxylated products, etc.) of the aforementioned compounds having two ethylenic unsaturated bonds, which may be ethoxylated 1,6-hexanediol di(meth)acrylate, ethoxylated neopentyl glycol di(meth)acrylate, and propoxylated neopentyl glycol di(meth)acrylate, etc.

In addition, one or more types of alkylene oxide-modified products (for example, ethylene oxides, propylene oxides, etc.) of the aforementioned compounds having two ethylenic unsaturated bonds, which may be one or more types selected from the group that consists of, for example, ethylene oxide (EO)-modified bisphenol A di(meth)acrylate, propylene oxide (PO)-modified bisphenol A di(meth)acrylate, EO-modified hydrogenated bisphenol A di(meth)acrylate, PO-modified hydrogenated bisphenol A di(meth)acrylate, EO-modified bisphenol F di(meth)acrylate, PO-modified bisphenol F di(meth)acrylate, EO-modified tetrabromobisphenol A di(meth)acrylate, bisphenol A tetraethylene oxide adduct di(meth)acrylate, bisphenol F tetraethylene oxide adduct di(meth)acrylate, bisphenol S tetraethylene oxide adduct di(meth)acrylate, hydrogenated bisphenol A tetraethylene oxide adduct di(meth)acrylate, hydrogenated bisphenol F tetraethylene oxide adduct di(meth)acrylate, EO-modified neopentyl glycol di(meth)acrylate, PO-modified neopentyl glycol di(meth)acrylate, (meth)acrylic acid polyethylene glycol monovinyl ether, (meth)acrylic acid polypropylene glycol monovinyl ether, neopentyl glycol PO (propylene oxide)-modified di(meth)acrylate, and isocyanuric acid EO-modified di(meth)acrylate, may be used.

Also, one or more types of caprolactone-modified products of the aforementioned compounds having two ethylenic unsaturated bonds, which may be one or more types selected from the group that consists of, for example, bisphenol A tetraethylene oxide adduct dicaprolactonate di(meth)acrylate, bisphenol F tetraethylene oxide adduct dicaprolactonate di(meth)acrylate, hydroxypivalyl hydroxypivalate dicaprolactonate di(meth)acrylate, and caprolactone adduct di(meth)acrylate of hydroxypivalic acid neopentyl glycol ester, may be used.

(Compounds Having Three Ethylenic Unsaturated Bonds)

The active energy ray curable inkjet ink compositions under the present invention may contain known compounds having three ethylenic unsaturated bonds.

Among such compounds having three ethylenic unsaturated bonds, any known compounds may be used without limitation including, for example, glycerin tri(meth)acrylate, tetramethylolmethane triacrylate, tetramethylolpropane tri (meth)acrylate, tris(2-hydroxyethyl)isocyanurate tri(meth) acrylate, trimethylolethane tri(meth)acrylate, trimethyloloctane tri(meth)acrylate, trimethylolpropane tri(meth)acrylate, trimethylolpropane trivinyl ether, trimethylolhexane tri (meth)acrylate, pentaerythritol tri(meth)acrylate, pentaerythritol triallyl ether, pentaerythritol trivinyl ether, 1,3, 5-tri(meth)acryloylhexahydro-s-triazine, dipentaerythritol tri(meth)acrylate tripropionate, isocyanuric acid tri(meth) acrylate, tris(acryloyloxy)phosphate, etc.

Also included are ethoxylated trimethylolpropane tri (meth)acrylate, propoxylated trimethylolpropane tri(meth) acrylate, glycerin propoxytri(meth)acrylate, trimethylolpropane tricaprolactonate tri(meth)acrylate, glycerin PO-modified tri(meth)acrylate, trimethylolpropane PO-modified tri(meth)acrylate, isocyanuric acid EO-modified tri(meth)acrylate, isocyanuric acid EO-modified F-caprolactone-modified tri(meth)acrylate, caprolactone-modified trimethylolpropane tri(meth)acrylate, and other ethoxylated, propoxylated, butoxylated, or other alkoxylated products, as well as ethylene oxide-, propylene oxide-, or other alkylene oxide-modified products, and caprolactone-modified products, of trifunctional monomers, etc.

(Compounds Having Four or More Ethylenic Unsaturated Bonds)

The active energy ray curable inkjet ink compositions under the present invention may use known compounds having four or more ethylenic unsaturated bonds.

Among such compounds having four or more ethylenic unsaturated bonds, any known compounds may be used without limitation including, for example, compounds having four ethylenic unsaturated bonds, compounds having five ethylenic unsaturated bonds, compounds having six ethylenic unsaturated bonds, and compounds having seven or more ethylenic unsaturated bonds.

The compounds having four or more ethylenic unsaturated bonds include, for example, diglycerin tetra(meth) acrylate, ditrimethylolethane tetra(meth)acrylate, ditrimethyloloctane tetra(meth)acrylate, ditrimethylolbutane tetra (meth)acrylate, ditrimethylolpropane tetra(meth)acrylate, ditrimethylolpropane tetracaprolactonate tetra(meth)acrylate, ditrimethylolhexane tetra(meth)acrylate, trimethylolpropane tetra(meth)acrylate, pentaerythritol tetra(meth) acrylate, pentaerythritol tetraallyl ether, pentaerythritol tetracaprolactonate tetra(meth)acrylate, pentaerythritol tetravinyl ether, dipentaerythritol tetra(meth)acrylate, tetramethylolmethane tetra(meth)acrylate, oligoester tetra(meth) acrylate, dipentaerythritol penta(meth)acrylate, dipentaerythritol hexa(meth)acrylate, tripentaerythritol hexa (meth)acrylate, tripentaerythritol hepta(meth)acrylate, tripentaerythritol polyalkylene oxide hepta(meth)acrylate, tripentaerythritol octa(meth)acrylate, etc.

Also included are ethylene oxide-modified pentaerythritol tetra(meth)acrylate, ethoxylated pentaerythritol tetra(meth) acrylate, and other ethoxylated, propoxylated, butoxylated, or other alkoxylated products, as well as ethylene oxide-, propylene oxide-, or other alkylene oxide-modified products, and caprolactone-modified products, of tetrafunctional or higher functional monomers, etc.

<Epoxylated Plant Oil (Meth)Acrylate Compounds>

The active energy ray curable inkjet ink compositions under the present invention may contain known epoxylated plant oil (meth)acrylate compounds. Since epoxylated plant oil (meth)acrylates are derived from plant oils, they can increase the amounts of biomass components in the active energy ray curable inkjet ink compositions.

The epoxylated plant oil (meth)acrylate compounds are obtained by (meth)acrylic-modifying epoxylated plant oils and include, for example, compounds that are obtained by ring-opening-addition-polymerizing of (meth)acrylic acids to the epoxy groups in epoxylated plant oils produced by epoxylating the double bonds of unsaturated plant oils with peracetic acid, perbenzoic acid, or other oxidizing agent, etc.

(Oligomers or Polymers)

The active energy ray curable inkjet ink compositions under the present invention may contain known polymers or oligomers having ethylenic unsaturated bonds.

The polymers or oligomers having ethylenic unsaturated bonds include those having one or more ethylenic unsaturated bonds of one or more types selected from the group that consists of (meth)acryloyl groups, vinyl groups, etc.

The polymers or oligomers having ethylenic unsaturated bonds include, for example, polydiallyl phthalates, neopentyl glycol oligo(meth)acrylates, 1,4-butanediol oligo(meth) acrylates, 1,6-hexanediol oligo(meth)acrylates, trimethylolpropane oligo(meth)acrylates, pentaerythritol oligo(meth) acrylates, polyester urethane diacrylate oligomer, and other urethane (meth)acrylates, polyester acrylate oligomer and other polyester (meth)acrylates, epoxy (meth)acrylates, rosin-modified epoxy (meth)acrylates, unsaturated polyesters, polyether (meth)acrylates, acrylic-based resins having unreacted unsaturated groups, unsaturated polyethers, unsaturated polyamides, unsaturated polyurethanes, acrylic-modified phenol-based resins, acrylated amine compound oligomers, etc.

It should be noted that plant oil-modified multifunctional polyester oligomers may or may not be contained.

(Other Resins Having No Ethylenic Unsaturated Bonds)

As other resins having no ethylenic unsaturated bonds, any known resins may be used without specific limitations, to the extent that doing so does not lead to lower performance, according to the properties to be added to the active energy ray curable inkjet ink compositions, particularly appropriate viscoelasticity properties, as well as printing properties of the ink compositions to be constituted, etc.

Among the other resins having no ethylenic unsaturated bonds, one or more types selected from the group that consists of, for example, acrylic-based resins, polyester-based resins, styrene-based resins, polyolefin-based resins, epoxy-based resins, polyurethane-based resins, phenol-based resins, rosin-based resins, block polymers, graft polymers (core-shell polymers), acrylic-modified phenol-based resins, rosin-modified phenol-based resins, rosin-modified alkyd-based resins, rosin-modified petroleum-based resins, rosin-modified maleic acid resins, rosin ester-based resins, fatty acid-modified rosin-based resins, petroleum-based resin-modified phenol-based resins, alkyd-based resins, plant oil-modified alkyd-based resins, petroleum-based resins, hydrocarbon-based resins (polybutene, polybutadiene, etc.), fluororesins (tetrafluoroethylene (PTFE) resin waxes, etc.), ketone resins, etc., may be used.

It is particularly preferable that one or more types selected from the group that consists of acrylic-based resins (acrylic acid ester-styrene copolymer-based resins, etc.), styrene-based resins (styrene-acrylic acid ester copolymer-based resins, etc.), rosin-modified phenol-based resins, rosin-modified alkyd-based resins, rosin-modified maleic acid resins, rosin ester-based resins, fatty acid-modified rosin-based resins, alkyd-based resins, and plant oil-modified alkyd-based resins may be used.

Among such resins, those having a weight-average molecular weight of 500 to 300,000 are preferred. Also, their acid value is preferably 1 to 100 mgKOH/g from the viewpoint of quick drying property when active energy rays are irradiated, and the like.

When each active energy ray curable inkjet ink composition contains the aforementioned resin components, the content of the resin components in the active energy ray curable inkjet ink composition may be adjusted to 0 to 30.0% by mass, or preferably 0 to 20.0% by mass.

It should be noted that acrylate prepolymers having silicone structures may or may not be contained.

<Polymerization Initiators>

The active energy ray curable inkjet ink compositions may contain known polymerization initiators.

The polymerization initiators are not specifically limited so long as they generate radicals or other active species when irradiated with active energy rays to cause the active energy ray curable inkjet ink compositions to start polymerizing, and one or more types selected from the group that consists of, for example, redox initiators, thermal polymerization initiators, photopolymerization initiators, etc., may be used. It should be noted that, if the active energy ray curable inkjet ink compositions under the present invention are cured with electron beams, polymerization initiators need not be aways contained.

The redox initiators combine peroxides and reducing agents to demonstrate a polymerization initiating function through an oxidation-reduction reaction under mild conditions.

The thermal polymerization initiators or photopolymerization initiators demonstrate a polymerization initiating function by generating radicals when irradiated with active energy rays (infrared rays, ultraviolet rays, LEDs, electron beams, etc.), respectively.

The polymerization initiators are selected as deemed appropriate according to the application, purpose, etc., and although use of the photopolymerization initiators is normally preferred, the redox initiators may be used when toxicity must be considered because their toxicity is relatively lower than the thermal polymerization initiators and photopolymerization initiators presenting high potential toxicity.

Of these, preferably photoradical polymerization initiators having light-absorbing properties over wavelengths of 450 to 300 nm and capable of manifesting a function as a curing reaction (radical polymerization) initiator under light having wavelengths in this range, are used from the viewpoint of achieving good curability under ultraviolet rays from light-emitting diode (LED) light sources.

Among the photoradical polymerization initiators, one or more types selected from the group that consists of, for example, acylphosphine oxide-based compounds, triazine-based compounds, aromatic ketone-based compounds, aromatic onium salt-based compounds, organic peroxides, thioxanthone-based compounds, thiophenyl-based compounds, anthracene-based compounds, hexaarylbiimidazole-based compounds, ketoxime ester-based compounds, borate-based compounds, azinium-based compounds, metallocene-based compounds, active ester-based compounds, halogenated hydrocarbon-based compounds, alkylamine-based compounds, iodonium salt-based compounds, sulfonium salt-based compounds, etc., may be used.

Among the acylphosphine oxide-based compounds, one or more types selected from the group that consists of, for example, 2,4,6-trimethylbenzoyl-diphenyl-phosphine oxide, bis(2,4,6-trimethylbenzoyl)-phenylphosphine oxide, etc., may be used.

Among the triazine-based compounds, one or more types selected from the group that consists of, for example, 2,4,6-trichloro-s-triazine, 2-phenyl-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-pipenyl-4,6-bis(trichloromethyl)-s-triazine, 2,4-bis(trichloromethyl)-6-styryl-s-triazine, 2-(naphth-1-yl)-4,6-bis(trichloromethyl)-s-triazine, 2-(4-methoxy-naphth-1-yl)-4,6-bis(trichloromethyl)-s-triazine, 2,4-trichloromethyl-(piperonyl)-6-triazine, 2,4-trichloromethyl(4'-methoxystyryl)-6-triazine, etc., may be used.

Additionally, one or more types selected from the group that consists of, for example, benzophenone, diethyl thioxanthone, 2-methyl-1-(4-methylthio)phenyl-2-morpholino-propane-1-one, 4-benzoyl-4'-methyldiphenyl sulfide, 1-chloro-4-propoxythioxanthone, isopropyl thioxanthone, 2-hydroxy-2-methyl-1-phenylpropane-1-one, 1-hydroxycyclohexyl phenyl ketone, 1-[4-(2-hydroxyethoxy)-phenyl]-2-hydroxy-2-methyl-1-propane-1-one, 2,2-dimethyl-2-hydroxyacetophenone, 2,2-dimethoxy-2-phenylacetophenone, 2-benzyl-2-dimethylamino-1-(morpholinophenyl)-butane-1-one, etc., may be used.

Among such photopolymerization initiators, IRGACURE 907, 369, 184, 379, 819, etc., by BASF SE, TPO, DETX, etc., by Lamberti S.p.A., TAZ-204, etc., by Midori Kagaku Co., Ltd., may be used, for example.

The content of photopolymerization initiators in each ink composition may be determined as deemed appropriate according to the components of the active energy ray curable inkjet ink composition, etc., and may be, for example, 0.1 to 25.0% by mass, or preferably 0.1 to 15.0% by mass, or more preferably 1.0 to 15.0% by mass, in the active energy ray curable inkjet ink composition.

When the content of photopolymerization initiators in the ink composition is within the aforementioned ranges, sufficient curability of the ink composition can be achieved simultaneously with good internal curability and cost, which is desirable.

<Sensitizers>

The active energy ray curable inkjet ink compositions under the present invention may contain sensitizers from the viewpoint of improving curability, to the extent that the effects of the present invention are not impaired. Any of the foregoing sensitizers may be used alone, or two or more types may be combined.

While sensitizers are not specifically limited, the sensitizers include thioxanthone-based, 4,4'-bis(diethylamino)benzophenone- and other benzophenone-based, anthraquinone-based, coumarin-based, etc. Of these, 2,4-diethylthioxanthone, 2,4-dimethylthioxanthone, 2,4-diethylthioxanthene-9-one, 2,4-dichlorothioxanthone, 1-chloro-4-propoxythioxanthone, 2-chlorothioxanthone, 2-isopropylthioxanthone, 4-isopropylthioxanthone and other thioxanthone-based compounds, 9,10-dibutoxyanthracene, 9,10-diethoxyanthracene, 9,10-dipropoxyanthracene, 9,10-bis(2-ethylhexyloxy)anthracene and other anthracene-based compounds, Michler's ketone, 4,4'-bis-(diethylamino)benzophenone, and other 4,4'-dialkylamino benzophenones, etc., are used in particular.

In addition, polymeric sensitizers may also be used, such as thioxanthone-based polymeric sensitizers and acylphosphine-based polymeric sensitizers that include OMNIPOL-TX ((2-carboxymethoxythioxanthone)-(polytetramethylene glycol 250) diester, number-average molecular weight: 660, manufactured by IGM Resins B.V.), SPEEDCURE 7010 (molecular weight: 1839, manufactured by Lambson Ltd.), GENOPOL TX-1 (number-average molecular weight: 820, manufactured by RaHN AG), etc., as well as oligo (2-hydroxy-2-methyl-1-(4-(1-methylvinyl)phenyl)propane) (ESACURE KIP 150, ESACURE 1, manufactured by Lamberti S.p.A.), polyethylene glycol 200-di(ß-4 (4-(2-dimethylamino-2-benzyl)butanonylphenyl)piperazine (OMNIPOL 910, manufactured by IGM Resins B.V.), (carboxymethoxymethoxybenzophenone)-(polyethylene glycol 250) diester (OMNIPOL BP, manufactured by IGM Resins B.V.), etc. Any of these may be used alone, or multiple types may be combined.

Preferably the sensitizers are contained by 0.5 to 10.0 parts by mass relative to 100 parts by mass representing the total amount of all polymerizable components in the active energy ray curable inkjet ink composition. And, it is more preferably 1.0 part by mass or higher, or yet more preferably 1.5 parts by mass or higher, or most preferably 2.0 parts by mass or higher, while it is more preferably 6.0 parts by mass or lower, or yet more preferably 4.0 parts by mass or lower, or most preferably 3.5 parts by mass or lower.

<Pigments and Dyes>

The first active energy ray curable inkjet ink composition and second active energy ray curable inkjet ink composition under the present invention may each independently contain, or not contain, pigments and dyes. If these are not contained, colorless, clear compositions will result.

For the pigments, various types of inorganic pigments, organic pigments, etc., generally used in active energy ray curable inkjet ink compositions may be used. Or, clear compositions not containing these pigments may be used.

To be specific, the inorganic pigments include titanium oxide, red iron oxide, antimony red, cadmium yellow, cobalt blue, Prussian blue, ultramarine blue, carbon black, graphite, and other colored pigments, as well as calcium carbonate, kaolin, clay, barium sulfate, aluminum hydroxide, talc, and other extender pigments. Additionally, the organic pigments include soluble azo pigments, insoluble azo pigments, azo lake pigments, condensed azo pigments, copper phthalocyanine pigments, condensed polycyclic pigments, etc. Also included are titanium oxide, rutile-type titanium oxides having silica and/or alumina-based treatment layers, and other white pigments, as well as other coloring pigments. If pigments are contained, their content is 1 to 50% by mass relative to the total mass of each active energy ray curable inkjet ink composition under the present invention. The present invention is useful for titanium oxide which is an inorganic pigment.

For the dyes, various types of known dyes may be contained.

<Pigment Dispersants>

If the active energy ray curable inkjet ink compositions under the present invention contain pigments, preferably pigment dispersants are used.

The pigment dispersants are used to improve the dispersibility of the pigments and storage stability of the active energy ray curable inkjet ink compositions, and while any conventionally-used pigment dispersants can be used without specific limitations, preferably polymeric pigment dispersants are used in particular. Any of the foregoing pigment dispersants may be used alone, or two or more types may be combined.

The polymeric pigment dispersants include, for example, carbodiimide-based dispersants, polyester amine-based dispersants, fatty acid amine-based dispersants, modified polyacrylate-based dispersants, modified polyurethane-based dispersants, multichain polymeric nonionic-based dispersants, polymeric ionic-based dispersants, etc.

Such polymeric pigment dispersants include BYKJET-9150, BYKJET-9151, BYKJET-9170, DISPERBYK-168, DISPERBYK-190, DISPERBYK-198, DISPERBYK-2010, DISPERBYK-2012, DISPERBYK-2015 (BYK-Chemie GmbH), SMA 1440, SMA 2625, SMA 17352, SMA 3840, SMA 1000, SMA 2000, SMA 3000 (Cray Valley SA), JONCRYL 67, JONCRYL 678, JONCRYL 586, JONCRYL 611, JONCRYL 680, JONCRYL 682, JONCRYL 690, JONCRYL 819, JONCRYL-JDX 5050, EFKA 4550, EFKA 4560, EFKA 4585, EFKA 4701, EFKA 5220, EFKA 6230 (BASF SE), SOLSPERSE 20000, SOLSPERSE 27000, SOLSPERSE 36000, SOLSPERSE 41000, SOLSPERSE 41090, SOLSPERSE 43000, SOLSPERSE 44000, SOLSPERSE 46000, SOLSPERSE 47000, SOLSPERSE 54000, SOLSPERSE 56000 (Lubrizol Corporation), AJISPER PB821, AJISPER PB822, AJISPER PB824, AJISPER PB881 (Ajinomoto Fine-Techno Co., Inc.), etc.

The content of pigment dispersants is preferably 1.0% by mass or higher, or more preferably 5.0% by mass or higher, and preferably 100% by mass or lower, or more preferably 60.0% by mass or lower, relative to the total pigment mass, from the viewpoint of increasing dispersibility of the pigments and storage stability of the active energy ray curable inkjet ink compositions.

The active energy ray curable inkjet ink compositions under the present invention may contain polymerization inhibitors, surfactants, organic solvents, storability improving agents, UV absorbents, antioxidants, defoaming agents, antifungal agents, rustproofing agents, thickening agents, humectants, pH-adjusting agents, and various other types of additives, as other components.

(Polymerization Inhibitors)

The active energy ray curable inkjet ink compositions under the present invention may contain known polymerization inhibitors for the purpose of preventing polymerization during storage.

The polymerization inhibitors include, for example, p-methoxyphenol, catechol, tert-butyl catechol, butylhydroxytoluene, and other phenol compounds, hydroquinone, alkyl-substituted hydroquinone, phenothiazine, tocopherol acetate, nitrosamine, benzotriazole, hindered amine, etc.

(Surfactants)

The active energy ray curable inkjet ink compositions under the present invention may use known surfactants used in active energy ray curable inkjet ink compositions, according to the inkjet head used, without specific limitations. For example, these include nonionic surfactants, cationic surfactants, anionic surfactants, and betaine surfactants. Specific examples of the surfactants include, for example, silicone-based surfactants such as hydroxyl group-containing polyether-modified polydimethylsiloxane, polyether-modified polydimethyl siloxane, and other polyether-modified silicone oils, polyester-modified polydimethylsiloxane, polyester-modified polymethylalkylsiloxane, and other polyester-modified methylalkylpolysiloxanes, fluorine-based surfactants, acetylene-based surfactants, etc. Any of the foregoing surfactants may be used alone, or two or more types may be combined. In particular, silicone-based surfactants are preferred.

When surfactants are contained, their content is not specifically limited; however, the content is preferably such that the first and second active energy ray curable inkjet ink compositions will have a surface tension of 22.0 to 35.0 mN/m before curing, or more preferably 0.10 to 1.50% by mass in each active energy ray curable inkjet ink composition.

The silicone-based surfactants include BYK-307, BYK-315, BYK-331, BYK-333, BYK-347, BYK-348, BYK-349, BYK-345, BYK-377, BYK-378, BYK-3455 (BYK-Chemie GmbH), etc.

The fluorine-based surfactants include F-410, F-444, F-533 (DIC Corporation), FS-65, FS-34, FS-35, FS-31, FS-30 (DuPont de Nemours, Inc.), etc.

The acetylene-based surfactants include DYNOL 607, DYNOL 609, OLFINE E1004, OLFINE E1010, OLFINE E1020, OLFINE PD-001, OLFINE PD-002W, OLFINE PD-004, OLFINE PD-005, OLFINE EXP. 4001, OLFINE EXP. 4200, OLFINE EXP. 4123, OLFINE EXP. 4300 (Nissin Chemical Industry_Co., Ltd.), SURFYNOL 104E, SURFYNOL 104H, SURFYNOL 104A, SURFYNOL 104BC, SURFYNOL 104DPM, SURFYNOL 104PA, SURFYNOL 104PG-50, SURFYNOL 420, SURFYNOL 440, SURFYNOL 465 (Evonik Industries AG), etc.

In each of the active energy ray curable ink compositions under the present invention, the percentage of the surfactants is preferably 0.005% by mass or higher, or more preferably 0.01% by mass or higher, from the viewpoint of lowering the surface tension of the ink composition to increase its discharge stability from inkjet heads, while the percentage is preferably 1.5% by mass or lower, or more preferably 1.0% by mass or lower, from the viewpoint of controlling the production of bubbles in the ink composition during blending to increase the discharge stability.

(Solvents)

While the active energy ray curable ink compositions under the present invention may be solvent-free, solvents can be blended therein as necessary. The solvents include ester-based organic solvents, ether-based organic solvents, ether ester-based organic solvents, ketone-based organic solvents, aromatic hydrocarbon solvents, nitrogen-containing organic solvents, etc. Also, the solvents include those having a boiling point of 150 to 220° C. under 1 atmospheric pressure. Preferably use of solvents is minimized from the viewpoints of curability of the ink compositions, environmental problems, etc. The percentage of solvents is preferably 5% by mass or lower, or more preferably 2% by mass or lower, in each ink composition.

<Additives>

Various types of additives may be added to the active energy ray curable ink compositions under the present invention, to manifest various functionalities as necessary. To be specific, they include photostabilizers, UV absorbents, surface-treatment agents, storability improving agents, antioxidants, antiaging agents, crosslinking promoters, polymerization inhibitors, plasticizers, preservatives, pH-adjusting agents, defoaming agents, humectants, etc. Also, resins that function as a vehicle but are not curable may or may not be blended in. Additionally, solvents may or may not be contained. Also, waxes may or may not be added.

(Storability Improving Agents)

For the storability improving agents, hindered amines of N—$CH_3$ type, N—H type, N—OR type, etc., may be used.

(UV Absorbents)

The UV absorbents include benzophenone-based UV absorbents, benzotriazole-based UV absorbents, salicylate-based UV absorbents, hydroxyphenyltriazine-based UV absorbents, cyanoacrylate-based UV absorbents, nickel complex salt-based UV absorbents, etc.

(Antioxidants)

The antioxidants include phenol-based antioxidants, amine-based antioxidants, sulfur-based antioxidants, phosphorus-based antioxidants, etc.

(Defoaming Agents)

The defoaming agents include silicone-based defoaming agents, Pluronic (registered trademark)-based defoaming agents, etc.

<First Active Energy Ray Curable Inkjet Ink Composition>

The first active energy ray curable inkjet ink composition under the present invention must not only be able to demonstrate sufficient curability when irradiated with active energy rays, but it must also have sufficient adhesion to the target substrate on which to form digital embossing, as well as sufficient adhesion with the second active energy ray curable inkjet ink composition constituting the layer on the first active energy ray curable inkjet ink composition.

In addition, the first active energy ray curable inkjet ink composition must satisfy condition 1 stating: the first active energy ray curable inkjet ink composition has a viscosity of 14.0 cps (25° C.) or higher. Additionally, it is preferably 30.0 cps (25° C.) or higher. Also, it is preferably 80.0 cps (25° C.) or lower, or more preferably 70.0 cps (25° C.) or lower, or yet more preferably 60.0 cps (25° C.) or lower.

In addition, with respect to the substrate, preferably it satisfies condition 3 stating: (surface tension of the first active energy ray curable inkjet ink composition before curing)−(surface tension of the substrate surface) is −15.0 mN/m or greater.

Furthermore, with respect to the second active energy ray curable inkjet ink composition, it must satisfy condition 2 stating: (surface tension of the second active energy ray curable inkjet ink composition before curing)−(surface tension of the first active energy ray curable inkjet ink composition before curing) is 4.0 mN/m or greater.

So that it can satisfy these conditions, the first active energy ray curable inkjet ink composition contains compounds selected from the aforementioned active energy ray curable components. In particular, preferably it contains monofunctional photopolymerizable compounds, multifunctional photopolymerizable compounds, and surfactants.

Additionally, the surface tension of the first active energy ray curable inkjet ink composition before curing is preferably 22.0 mN/m or higher, or more preferably 23.0 mN/m or higher, or yet more preferably 24.0 mN/m or higher. Also, it is preferably 29.0 mN/m or lower, or more preferably 27.0 mN/m or lower.

In addition, preferably the time from the landing of the first active energy ray curable inkjet ink composition, to the pinning of its coating film by irradiating an active energy ray thereon, is within 0.5 seconds.

<Second Active Energy Ray Curable Inkjet Ink Composition>

The second active energy ray curable inkjet ink composition under the present invention must not only be able to demonstrate sufficient curability when irradiated with active energy rays, but it must also have sufficient adhesion to the layer constituted by the first active energy ray curable inkjet ink composition.

In addition, while there may be only one layer constituted by the second active energy ray curable inkjet ink composition, multiple layers may also be formed. In the case of the latter, it is also necessary that the stacked layers constituted by the second active energy ray curable inkjet ink composition have sufficient adhesion to each other. Also, if multiple layers are formed, each constituted by the second active energy ray curable inkjet ink composition, the component makeups and physical properties of the compositions constituting the multiple layers may be different from layer to layer, to the extent that the requirements of the present invention are satisfied. Additionally, the compositions constituting the multiple layers may have the same component makeups or physical properties at least partially.

In any case, the second active energy ray curable inkjet ink composition must satisfy condition 1 stating: the second active energy ray curable inkjet ink composition has a viscosity of 14.0 cps (25° C.) or higher. Additionally, it is preferably 30.0 cps (25° C.) or higher. Also, it is preferably 80.0 cps (25° C.) or lower, or more preferably 70.0 cps (25° C.) or lower, or yet more preferably 60.0 cps (25° C.) or lower.

Furthermore, with respect to the first active energy ray curable inkjet ink composition, it must satisfy condition 2 stating: (surface tension of the second active energy ray curable inkjet ink composition before curing)—(surface tension of the first active energy ray curable inkjet ink composition before curing) is 4.0 mN/m or greater, where it is preferably 6.0 mN/m or greater, or more preferably 8.0 mN/m or greater, or yet more preferably 10.0 mN/m or greater. When the difference is 4.0 mN/m or greater, combined with the fact that conditions 1 and 2 are met, high dots of 80 μm or higher from the substrate surface can be obtained by inkjet-printing the first and second active energy ray curable inkjet ink compositions once each.

So that it can satisfy these conditions, the second active energy ray curable inkjet ink composition contains compounds selected from the aforementioned active energy ray curable components. In particular, preferably it contains monofunctional photopolymerizable compounds, multifunctional photopolymerizable compounds, and surfactants.

Additionally, the surface tension of the second active energy ray curable inkjet ink composition before curing is preferably 26.0 mN/m or higher, or more preferably 27.0 mN/m or higher, or yet more preferably 28.0 mN/m or higher. Also, it is preferably 34.0 mN/m or lower, or more preferably 33.0 mN/m or lower, or yet more preferably 32.0 mN/m or lower.

Also, preferably the time from the landing of the second active energy ray curable inkjet ink composition, to the pinning of its coating film by irradiating an active energy ray thereon, is within 0.5 seconds.

<Method for Preparing Active Energy Ray Curable Inkjet Ink Compositions>

Next, how the active energy ray curable inkjet ink compositions under the present invention are manufactured using these materials, is explained.

The active energy ray curable inkjet ink compositions under the present invention can each be obtained by, for example, dispersing and mixing the components using a wet circulation mill, bead mill, ball mill, sand mill, attritor, roll mill, DCP mill, agitator, Henschel mixer, colloid mill, ultrasonic homogenizer, high-pressure homogenizer (Microfluidizer, Nanomizer, Ultimizer, Genus PY, DeBEE 2000, etc.), pearl mill, or other dispersion machine, and, if necessary, adjusting the viscosity of the active energy ray curable inkjet ink composition. It should be noted that the active energy ray curable inkjet ink compositions may each be prepared also by mixing together the dyes and pigments with the aforementioned pigment dispersants and photopolymerizable monomers to obtain a base ink composition beforehand, and then adding the remainder of the aforementioned components to a desired component makeup. Alternatively, the compositions can be made clear.

Another way is to mix the aforementioned components and then knead the mixture using a bead mill, three-roll mill, etc., to disperse the pigments (i.e., coloring components and extender pigments), after which additives (polymerization initiators, polymerization inhibitors, waxes, and other additives, etc.) are added as necessary, which is followed by adding of yet other components to adjust viscosity.

<Substrate Surface>

The target substrate on which to create digital embossing is a substrate constituted by one or more types of plastics, metals, papers, non-metal inorganic materials, etc., so long as it is a substrate that can be coated (printed) with active energy ray curable inkjet ink compositions. Also, the substrate may have a printing layer, coating film layer, primer, or other base layer, etc., formed on it by any known means, or it may have undergone corona discharge treatment, plasma discharge treatment, or other pretreatment, or chemical treatment, or other base treatment. Also, among these base layer formations and base treatments, multiple processes can be performed in combination. In the Specification, the substrate surface represents a layer on which a layer constituted by the first active energy ray curable inkjet ink composition is formed directly, being a surface resulting from any given formation of the printing layer, etc., or base layer or application of base treatment, etc., as described above, on the aforementioned substrate.

Particularly when a substrate is adopted on which patterns have already been formed by a printing layer, etc., creating digital embossing as proposed by the present invention can produce improved aesthetics, etc., through harmonization of these patterns with digital embossing, and the like.

Such printing layer can be formed using a printing method adopting any desired means according to the properties and material of the substrate, etc.

Also, the substrate surface, which is the surface of the layer that comes in direct contact with the layer constituted by the first active energy ray curable inkjet ink composition, can have any surface tension. Then, preferably, its relationship with the surface tension, before curing, of the layer directly constituted by the first active energy ray curable inkjet ink composition satisfies condition 3 ((surface tension of the first active energy ray curable inkjet ink composition before curing)–(surface tension of the substrate surface) is –15.0 mN/m or greater). When this condition 3 is satisfied, the layer constituted by the first active energy ray curable inkjet ink composition is more likely to sufficiently conform to the substrate surface while at the same time adhering to it with sufficient adhesive force.

Also, preferably the surface tension of the substrate surface is 22.0 to 40.0 mN/m. It should be noted that, when this is the case, the layer constituted by the first active energy ray curable inkjet ink composition, or specifically the layer of the ink composition that was discharged by an inkjet-type application device and deposited and cured on the substrate surface, can also be formed as a layer having sufficient height.

For the plastics, among the aforementioned materials that may be used as the substrates, one or more types selected from the group that consists of, for example, polyester-based polymers (for example, polyethylene terephthalate (PET), polyethylene naphthalate, etc.), cellulose-based polymers (for example, diacetyl cellulose, triacetyl cellulose (TAC), etc.), polycarbonate-based polymers, polyacrylic-based polymers (for example, polymethyl methacrylate, etc.), vinyl chloride-based polymers, polyolefin-based polymers (for example, polyethylene, polypropylene, polyolefin polymers having a cyclic or norbornene structure, ethylene-propylene copolymer polymers, etc.), polyamide-based polymers (for example, nylon, aromatic polyamide polymers, etc.), polystyrene-based polymers (for example, polystyrene, acrylonitrile-styrene copolymer polymers, etc.), polyimide-based polymers, polysulfone-based polymers, polyether sulfone-based polymers, polyether ketone-based polymers, polyphenyl sulfide-based polymers, polyvinyl alcohol-based polymers, polyvinylidene chloride-based polymers, polyvinyl butyral-based polymers, polyarylate-based polymers, polyoxymethylene-based polymers, and polyepoxy-based polymers, as well as blends of these polymers, etc., may be used.

For the metals, among the aforementioned materials that may be used as the substrates, aluminum, iron, zinc, nickel, copper, tin, titanium, and other metals that are known as printing targets, as well as alloys thereof, etc., may be adopted, for example.

For the papers, among the aforementioned materials that may be used as the substrates, uncoated paper, coated paper, corrugated paper, and other papers that are known to be used as printing substrates may be adopted, for example.

For the non-metal inorganic materials, among the aforementioned materials as the substrates, ceramic, earthenware, plaster, etc., that are known to be usable as printing substrates may be adopted.

<Digital Embossing Formation Method>

The digital embossing formation method proposed by the present invention involves printing the first active energy ray curable inkjet ink composition on the substrate surface using an inkjet-type application device (hereinafter also referred to as "inkjet printing-capable device"), followed by irradiating with an energy ray, and thereby curing, the resulting printed layer. It should be noted that individual liquid droplets under the method proposed by the present invention may be enlarged so that office or standard printing devices may not be used.

Next, on the surface of the cured printing layer of the first active energy ray curable inkjet ink composition, the second active energy ray curable inkjet ink composition is printed using an inkjet printing-capable device, followed by irradiating with an energy ray, and thereby curing, the resulting printing layer.

Digital embossing conforming to the present invention may be created this way by printing the second active energy ray curable inkjet ink composition only once using an inkjet printing-capable device. To obtain three-dimensional patterns with higher convex parts, however, the second active energy ray curable inkjet ink composition is printed again using an inkjet printing-capable device over the surface of the cured printing layer of the second active energy ray curable inkjet ink composition, followed by irradiating with an energy ray, and thereby curing, the resulting printing layer. And, this operation is repeated anywhere between once and 10 times or, if necessary, the second active energy ray curable inkjet ink composition is printed up to a total of 15 times, so that the cured layers formed by the second active energy ray curable inkjet ink composition are stacked to create digital embossing with even higher convex parts.

When printing the first active energy ray curable inkjet ink composition, the size of one liquid droplet is 10.0 pl or greater, and when printing the second active energy ray curable inkjet ink composition once or more times over the printing layer formed by the first active energy ray curable inkjet ink composition, the size of one liquid droplet is 10.0 pl or greater.

Additionally, when inkjet-printing each of the first active energy ray curable inkjet ink composition and second active energy ray curable inkjet ink composition independently, the size of one liquid droplet is preferably 15.0 pl or greater, or more preferably 20.0 pl or greater, or yet more preferably 25.0 pl or greater, or most preferably 30.0 pl or greater. Also, it is preferably 120.0 pl or smaller.

By forming digital embossing this way, the total sum of the film thickness of one cured layer of the first active energy ray curable inkjet ink composition, and film thickness of one cured layer of the second active energy ray curable inkjet ink composition, can reach 10.0 μm or greater.

Embossed convex parts can be formed to desired shapes by controlling the inkjet printing. Under the present invention, however, preferably embossing is formed under specific conditions to keep the smallest convex parts to 120 μm or smaller in flat area size.

Additionally, regarding the heights of digital embossing formed by inkjet-printing using the first active energy ray curable inkjet ink composition and second active energy ray curable inkjet ink composition, the ratio of the numeric value of the dot height (μm) of the digital embossing formed at each point on the substrate, to the numeric value of the total volume (pl (picolitres)) of the liquid droplets, each discharged there from each inkjet printing, can reach an extremely high value of 80 to 110%.

<Applications of Digital Embossing>

Digital embossing obtained by the present invention can be adopted for flooring materials, wall materials, and other interior finishing materials, furniture, vehicle interiors, storage containers, and other articles requiring anti-slip function or aesthetics, etc.

EXAMPLES

The present invention is explained more specifically below using examples. However, the present invention is not limited to these examples alone. It should be noted that, unless otherwise specified, "%" and "part" refer to "% by mass" and "part by mass," respectively (numeric values shown in the tables are parts by mass).

The materials used in, and methods for preparation thereof, are described below.

<Creation of Digital Embossing in Examples 1 to 8 and Comparative Examples 1 to 4>

First active energy ray curable inkjet ink compositions were obtained based on the component makeups shown in Table 1. In addition, second active energy ray curable inkjet ink compositions were obtained based on the component makeups shown in Table 2.

Using the first active energy ray curable inkjet ink composition in Example 1 per Table 1, a first layer was inkjet-printed on the surface of a polyethylene terephthalate film (surface tension: 36 mN/m), and this layer was irradiated with an ultraviolet ray and pinned. When the first layer was formed, the liquid ink droplets had a volume per liquid droplet of 35 pl.

Next, using the second active energy ray curable inkjet ink composition in Example 1 per Table 2, a second layer was inkjet-printed on the first layer and an ultraviolet ray was irradiated to cure this layer. This layering of the second active energy ray curable inkjet ink composition was performed twice. When the second layer was formed, the liquid ink droplets had an average volume per liquid droplet of 35 pl. Since the second layer was constituted by stacked layers through two inkjet printings, each printing location of the second layer was a layered location resulting from a total of two over-printings, formed by 35 pl×2, or 70 pl, of ink composition. As a result, a total of three layers of the first active energy ray curable inkjet ink composition and second active energy ray curable inkjet ink composition were stacked.

Example 2 and the subsequent Examples, as well as the Comparative Examples, were performed in the same manner.

Also, Example 8 represents an example adopting the same ink compositions in Example 1 for use in the first layer and the second layer, except that the number of over-printings to form the second layer was increased from the aforementioned two to seven, and the liquid droplets in each of these seven inkjet printings were adjusted to 10 pl per droplet.

In both the Examples and Comparative Examples, printing was performed in dot patterns.

IBXA: Isobornyl acrylate
ACMO: Acryloylmorpholine
CN371: Amine-modified acrylate monomer (Sartomer Inc.)
SR217: 4-t-butylcyclohexyl acrylate (Sartomer Inc.)
HDDA: 1,6-hexanediol diacrylate
CN991: Polyester urethane diacrylate oligomer (Sartomer Inc.)

CN2271: Polyester acrylate oligomer (Sartomer Inc.)
TPO: Diphenyl(2,4,6-trimethylbenzoyl)phosphine oxide (OMNIRAD-TPO (IGM Resins B.V.))
BYK-377: Hydroxyl group-containing polyether-modified polydimethylsiloxane (BYK-Chemie GmbH)
BYK-331: Polyether-modified polydimethylsiloxane (BYK-Chemie GmbH)
BYK-315: Polyester-modified polymethylalkylsiloxane (solids content: 25%) (BYK-Chemie GmbH)
BYK-381: Acrylic-based polymer (BYK-Chemie GmbH)

<Dot Height>

The digitally embossed substrate was cut along a face perpendicular to the substrate surface. This cut face was observed with a microscope to visually measure 100 embossed parts for their individual emboss heights, or specifically, heights of the parts where the cured first active energy ray curable inkjet ink composition and cured second active energy ray curable inkjet ink composition were layered, and the average value was obtained.

TABLE 1

| First | Examples | | | | | | | | Comparative Examples | | | |
|---|---|---|---|---|---|---|---|---|---|---|---|---|
| layer | 1 | 2 | 3 | 4 | 5 | 6 | 7 | 8 | 1 | 2 | 3 | 4 |
| IBXA | 50.0% | | | 50.0% | 30.0% | 50.0% | 50.0% | 50.0% | 50.0% | 50.0% | 30.0% | 50.0% |
| ACMO | | 50.0% | 50.0% | | | | | | | | | |
| CN371 | 10.0% | 10.0% | 20.0% | 20.0% | 20.0% | 20.0% | 10.0% | 10.0% | 20.0% | 20.0% | 20.0% | 20.0% |
| SR217 | 29.5% | 29.5% | 19.5% | 19.5% | 19.5% | 9.5% | 19.5% | 29.5% | 19.5% | 19.5% | 19.5% | 19.5% |
| HDDA | | | | | 20.0% | | | | | | 20.0% | |
| CN991 | | | | | | 10.0% | | | | | | |
| CN2271 | | | | | | | 10.0% | | | | | |
| TPO | 10.0% | 10.0% | 10.0% | 10.0% | 10.0% | 10.0% | 10.0% | 10.0% | 10.0% | 10.0% | 10.0% | 10.0% |
| BYK-377 | 0.5% | | 0.5% | 0.5% | | | 0.5% | 0.5% | 0.5% | | | |
| BYK-331 | | 0.5% | | | 0.5% | | | | | | 0.5% | |
| BYK-315 | | | | | | 0.5% | | | | | | |
| BYK-381 | | | | | | | | | | 0.5% | | 0.5% |
| Total | | | | | | 100.00% | | | | | | |
| Surface tension | 24 | 25 | 22 | 24 | 25 | 28 | 24 | 24 | 24 | 32 | 24 | 32 |
| Viscosity (cps) | 15 | 18 | 30 | 28 | 30 | 32 | 25 | 15 | 28 | 28 | 30 | 28 |
| Pinning of first layer | Yes | Yes | Yes | Yes | Yes | Yes | Yes | Yes | Yes | Yes | No | Yes |

TABLE 2

| Second | Examples | | | | | | | | Comparative Examples | | | |
|---|---|---|---|---|---|---|---|---|---|---|---|---|
| layer | 1 | 2 | 3 | 4 | 5 | 6 | 7 | 8 | 1 | 2 | 3 | 4 |
| IBXA | 50.0% | | | 50.0% | 30.0% | 50.0% | 50.0% | 50.0% | 50.0% | 50.0% | 30.0% | 50.0% |
| ACMO | | 50.0% | 50.0% | | | | | | | | | |
| CN371 | 10.0% | 10.0% | 20.0% | 20.0% | 20.0% | 20.0% | 10.0% | 10.0% | 20.0% | 20.0% | 20.0% | 20.0% |
| SR217 | 30.0% | 29.5% | 19.5% | 19.5% | 20.0% | 9.5% | 19.5% | 30.0% | 19.5% | 19.5% | 20.0% | 19.5% |
| HDDA | | | | | 20.0% | | | | | | 20.0% | |
| CN991 | | | | | | 10.0% | | | | | | |
| CN2271 | | | | | | | 10.0% | | | | | |
| TPO | 10.0% | 10.0% | 10.0% | 10.0% | 10.0% | 10.0% | 10.0% | 10.0% | 10.0% | 10.0% | 10.0% | 10.0% |
| BYK-377 | | | | | | | | | | | | |
| BYK-331 | | | | | | | | | 0.5% | | | 0.5% |
| BYK-315 | | | | 0.5% | | | | | | 0.5% | | |
| BYK-381 | | 0.5% | 0.5% | | | 0.5% | 0.5% | | | | | |
| Total | | | | | | 100.0% | | | | | | |
| Surface tension | 31 | 32 | 32 | 28 | 32 | 32 | 32 | 31 | 25 | 29 | 32 | 25 |
| Viscosity (cps) | 15 | 18 | 30 | 28 | 30 | 32 | 25 | 15 | 28 | 28 | 30 | 28 |

TABLE 3

| Embossing formation results | Examples | | | | | | | | Comparative Examples | | | |
|---|---|---|---|---|---|---|---|---|---|---|---|---|
| | 1 | 2 | 3 | 4 | 5 | 6 | 7 | 8 | 1 | 2 | 3 | 4 |
| Surface tension difference (mN/m) (second layer) – (first layer) | 7 | 7 | 10 | 4 | 7 | 4 | 8 | 7 | 1 | –3 | 8 | –7 |
| Dot height (µm) | 100 | 100 | 100 | 90 | 90 | 90 | 100 | 100 | 70 | 60 | 50 | 60 |

Dots that were sufficiently high and cured could be obtained in each Example. The same was true with Example 8 where more inkjet ink composition was layered in forming the second layer. By contrast, dots with sufficient height could not be obtained in Comparative Examples 1, 2, and 4 not meeting condition 2, or in Comparative Example 3 where the second active energy ray curable inkjet ink composition was landed over the first active energy ray curable inkjet ink composition without pinning the latter after landing.

What is claimed:

1. A digital embossing creation method using active energy ray curable inkjet ink compositions, the digital embossing creation method comprising:

landing a first active energy ray curable inkjet ink composition on a substrate surface by inkjet printing in a form of liquid droplets of 10.0 pl or greater in volume per droplet, and then irradiating the landed first active energy ray curable inkjet ink composition with an active energy ray for pinning, to form a first layer; and then landing a second active energy ray curable inkjet ink composition on the first layer by inkjet printing in a form of liquid droplets of 10.0 pl or greater in volume per droplet, and then irradiating the landed second active energy ray curable inkjet ink composition with an active energy ray for curing, to form a second layer, thereby creating a digital embossed pattern on the substrate;

wherein the digital embossing creation method further satisfying condition 1 and condition 2 below:

condition 1: the first and second active energy ray curable inkjet ink compositions have a viscosity of 14.0 cps or higher at 25° C.; and condition 2: a value of [(surface tension of the second active energy ray curable inkjet ink composition before curing)–(surface tension of the first active energy ray curable inkjet ink composition before curing)] is 4.0 mN/m or greater.

2. The digital embossing creation method according to claim 1, which further satisfies condition 3: a value of [(surface tension of the first active energy ray curable inkjet ink composition before curing)–(surface tension of the substrate surface)] is –15.0 mN/m or greater.

3. The digital embossing creation method according to claim 1, wherein a surface tension of the substrate surface is 22.0 to 40.0 mN/m, the surface tension of the first active energy ray curable inkjet ink composition before curing is 22.0 to 29.0 mN/m, and the surface tension of the second active energy ray curable inkjet ink composition before curing is 26.0 to 34.0 mN/m.

4. The digital embossing creation method according to claim 1, wherein, after the first active energy ray curable inkjet ink composition and second active energy ray curable inkjet ink composition were each landed, each coating film is irradiated with an active energy ray at a duration within 0.5 seconds.

5. The digital embossing creation method according to claim 1, wherein the first active energy ray curable inkjet ink composition and the second active energy ray curable inkjet ink composition are each independently formulated and contain monofunctional photopolymerizable compounds, multifunctional photopolymerizable compounds, and surfactants.

6. The digital embossing creation method according to claim 1, wherein a total sum of a film thickness of a cured layer of the first active energy ray curable inkjet ink composition, and a film thickness of a cured layer of the second active energy ray curable inkjet ink composition, is 80.0 µm or greater.

7. The digital embossing creation method according to claim 1, wherein the first and second active energy ray curable inkjet ink compositions contain at least one component selected from alicyclic alkyl group-containing (meth)acrylates, acryloyl morpholine, and amine-modified acrylate monomers.

8. A digital embossing creation method according to claim 1, wherein the value of [(surface tension of the second active energy ray curable inkjet ink composition before curing)–(surface tension of the first active energy ray curable inkjet ink composition before curing)] is 6.0 mN/m or greater.

9. A digital embossing creation method according to claim 1, wherein the value of [(surface tension of the second active energy ray curable inkjet ink composition before curing)–(surface tension of the first active energy ray curable inkjet ink composition before curing)] is 10.0 mN/m or greater.

\* \* \* \* \*